United States Patent
Monzo et al.

(10) Patent No.: US 7,663,493 B2
(45) Date of Patent: Feb. 16, 2010

(54) CHILD CAR SEAT ALERT SYSTEM

(75) Inventors: Joseph J. Monzo, Las Vegas, NV (US);
William L. Timm, Henderson, NV (US);
Debra A. Sommese, Las Vegas, NV (US)

(73) Assignee: Inventions Inc., Las Vegas, NV (US)

( * ) Notice: Subject to any disclaimer, the term of this patent is extended or adjusted under 35 U.S.C. 154(b) by 645 days.

(21) Appl. No.: 11/591,378

(22) Filed: Nov. 1, 2006

(65) Prior Publication Data

US 2008/0100431 A1    May 1, 2008

(51) Int. Cl.
G08B 23/00    (2006.01)
(52) U.S. Cl. .................. 340/573.1; 280/808
(58) Field of Classification Search ............ 340/573.1
See application file for complete search history.

(56) References Cited

U.S. PATENT DOCUMENTS

| | | | | |
|---|---|---|---|---|
| 5,793,291 | A * | 8/1998 | Thornton ............... | 340/573.1 |
| 6,870,472 | B2 * | 3/2005 | Gift et al. ............... | 340/457 |
| 6,930,614 | B2 * | 8/2005 | Rackham et al. ........ | 340/686.1 |
| 2004/0164856 | A1 * | 8/2004 | Mesina ................... | 340/457.1 |
| 2006/0273917 | A1 * | 12/2006 | Rams ..................... | 340/667 |
| 2007/0132571 | A1 * | 6/2007 | Rossi ..................... | 340/457 |
| 2007/0268119 | A1 * | 11/2007 | Cram et al. ............. | 340/457 |

* cited by examiner

Primary Examiner—George A Bugg

(57) ABSTRACT

A system and method to warn that a child has been left unattended in the vehicle when the ignition is off. The system includes a sensing device to detect if a child is in the infant seat, an ignition detection device to detect that the ignition is off, a delay timer to provide a certain period of time for the caregiver to remove the child from the car seat or put the child in the infant/booster seat and then to generate an alarm, a speaker to sound the alarm, and a switching assembly to detect when the dome light goes on, or if the dome light is operable.

15 Claims, 1 Drawing Sheet

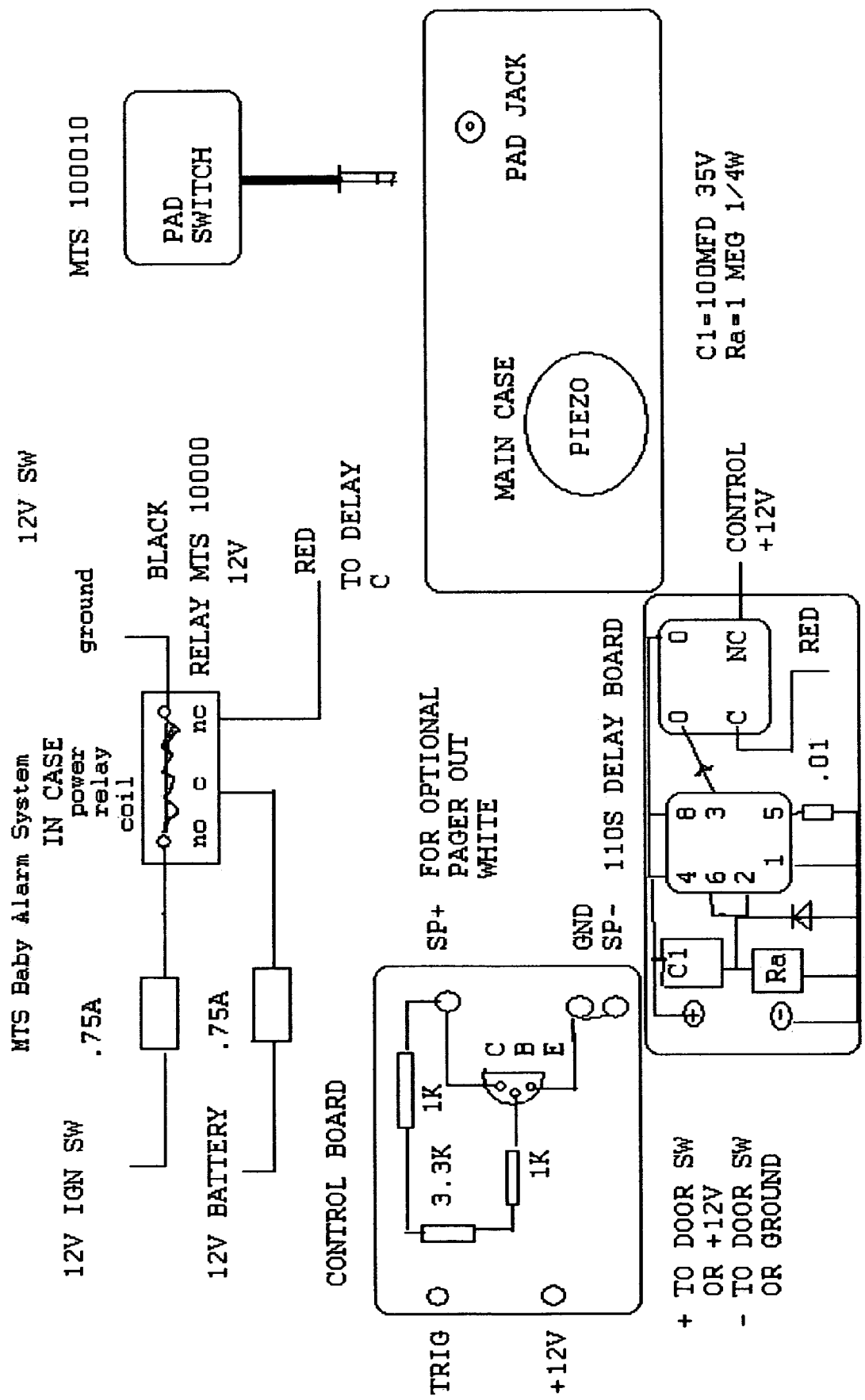

CHILD CAR SEAT ALERT SYSTEM

CROSS REFERENCE TO RELATED APPLICATIONS

| | | | |
|---|---|---|---|
| 5,793,291 | August 1998 | Thornton | 340/573.1 |
| 5,949,340 | September 1999 | Rossi | 340/573.1 |
| 6,104,293 | August 2000 | Rossi | 340/573.1 |
| 6,535,137 | March 2003 | Ryan | 340/687 |
| 6,714,132 | March 2004 | Edwards, et. al. | 340/573.1 |
| 6,812,844 | November 2004 | Burgess | 340.573.1 |
| 6,870,472 | March 2005 | Gift, et. al. | 340/457 |
| 6,922,147 | July 2005 | Viksnins, et. al. | 340/573.1 |
| 6,922,622 | July 2005 | Dulin, et. al. | 701/45 |
| 6,924,742 | August 2005 | Mesina | 340/573.1 |
| 7,012,533 | March 2006 | Younse | 340/573.1 |
| 7,106,207 | September 2006 | Marchan | 340/667 |
| 2006/0103516 | May 2006 | Zang | 340/457 |
| 2006/0139159 | June 2006 | Lee, et. al. | 340/457 |

FEDERALLY SPONSORED RESEARCH OR DEVELOPMENT

Not Applicable

SEQUENCE LISTING, TABLE, OR COMPUTER PROGRAM LISTING COMPACT DISC APPENDIX

Not Applicable

BACKGROUND OF THE INVENTION

There have been a number of tragic deaths in which children have mistakenly been left in automobiles after the driver reached a desired destination and left the vehicle. The deaths have usually been caused by a buildup of excess heat or cold within the vehicle during the absence of the driver. Infants, in particular, are susceptible to dehydration when subjected to the elevated temperatures within an enclosed vehicle, and can easily slip into a comatose state. Furthermore, no child should be left unattended in any vehicle for any length of time and for any reason.

One system for preventing children from becoming inadvertently locked within a vehicle is described in U.S. Pat. No. 5,793,291. The system utilizes a motion detector to detect the presence of a child or pet within a located vehicle. However, the system fails to protect infants who have been left asleep in their child seats and are not capable of sufficient activity to set off a motion detector. Such infants may continue sleeping and may become dehydrated and comatose without ever waking, and therefore, they may not be detected by a motion detector.

Another system described in U.S. Pat. No. 6,104,293 provides for a warning system that warns when a child is in an infant seat and the vehicle's ignition has been turned off. However, it would be costly and overly complicated to install because it connects to many of the vehicle's components.

Reference is also given to U.S. Pat. No. 6,922,622 where the use of one or more systems senses the occupancy state and temperature inside the passenger or load space. However, this would not protect infants stranded in their car seats in vehicles during extremely cold temperatures because the system activates when it senses the temperature is above a pre-set minimum.

Lastly, U.S. Pat. No. 6,714,132 utilizes a system and method with a wireless tether comprising a detector, transmitter and receiver. An alarm is communicated to the caregiver when the caregiver ventures outside the range of transmission between the transmitter and receiver without having removed the child from the position as sensed by the detector. However, the system does not have an alarm, and the pager could be turned off or not be heard.

Therefore, the present inventors have recognized that there is an unmet need for an affordable, improved and simpler system to save children's lives.

It is an objective of the invention to provide a system that alerts the caregiver when a child is in an infant seat or a booster seat and the car is off.

It is another objective of the invention to support up to two infant/booster seats and to be portable from one infant/booster car seat to another.

SUMMARY OF THE INVENTION

In accordance with the present invention, a self-activating system is provided for warning when a child is in an infant seat or a booster seat and the car is off. The system includes a detector, ignition detection mechanism, fuses, and a speaker. The system may be upgraded to include a pager.

The system includes a detector for sensing the presence and/or absence of a child in a car seat. The detector is waterproof and of high impedance. An ignition detection mechanism determines the state of the vehicle's ignition system. When the presence of a child is detected in the car seat, and the ignition of the auto has been turned off, a signal is sent to the speaker and the alarm goes off.

The dome light (from opening a door) will start a 110 second delay, preventing the alarm from triggering for 110 seconds. This provides the caregiver that much time to remove the child from the infant or booster seat. Furthermore, in the case of getting into the car, the 110 second delay will give the caregiver time to put the child into the infant or booster seat, get into the vehicle him/herself, and turn on the car.

The length of the delay is programmable in the manufacturing process and can be set for any length of time from 15 seconds to 5 minutes.

In the event that the dome light is always on, is inoperable, or has manually been turned off or otherwise disabled, the alarm will be in an instant-on mode of operation. The 110 second delay will not apply.

The sensor detecting the presence of a child in a car seat is completely portable to other car seats, having only two velcro attachment points. The system can accommodate up to two car seats simultaneously.

BRIEF DESCRIPTION OF THE DRAWINGS

FIG. 1 is a schematic block diagram of a self-activating system for alerting the caregiver when a child is in an infant seat or a booster seat and the car is turned off in accordance with an embodiment of the present invention.

DETAILED DESCRIPTION OF THE INVENTION

This simple and inexpensive system is intended for reducing the possibility of death or serious injury to a child from being left unattended in a car seat. The system is designed as an alert to trigger from the weight of the child in a car seat and the car ignition is off. The dome light enables the 110 second delay from entrance or exit.

Part # MTS 10100 Main Case contains the ignition power sensing relay, switching assembly, entry/exit delay timer, and speaker.

Part # MTS 100010 Pad Switch is the triggering system that sends the signal to the switching assembly. The normal installation is the pad is placed under the car seat cover and attached to the car seat frame.

What is claimed is:

1. An after market system adapted to fit on any infant seat, said system for detecting the presence of a child in an infant seat located within a vehicle comprising:
    means for detecting the presence and absence of a child in the infant seat;
    means for detecting an on and off state of the vehicle;
    means for automatically generating an alarm signal in response to said means for detecting the presence and absence of a child in the infant seat detecting the presence of a child in the infant seat for a pre-defined period of time after said means for detecting the on and off state of the vehicle detects an off state;
    an alarm responsive to said alarm signal, said alarm in communication with a speaker, said speaker positioned to alert occupants of said vehicle;
    means for delaying activation of said alarm, for a programmable time period, responsive to when a dome light of said vehicle is illuminated in response to a door of said vehicle being opened; and means for determining operability of said dome light.

2. The system of claim 1, wherein the means for detecting the presence and absence of a child in a car seat within a vehicle comprises a sensor located within the infant seat.

3. The system of claim 1, wherein the means for detecting an on and off state of the vehicle is a power relay operable to enable and disable the system.

4. The system of claim 1, wherein the means for generating said alarm comprises a switching assembly.

5. The system of claim 1, wherein said means for delaying activation of said alarm is a timer.

6. The system of claim 5, wherein said means for delaying activation of said alarm is fixed at 110 seconds.

7. The system of claim 1, wherein said means for determining operability of said dome light comprises a sensor.

8. The system of claim 1, further comprising means for incapacitating said means for delaying activation of said alarm in response to said means determining operability of said dome light determining that said dome light is inoperable.

9. The system of claim 1, wherein said speaker is located in the system enclosure.

10. An after market system adapted to fit on any infant seat, said system for detecting the presence of a child in an infant seat located within a vehicle comprising:
    at least one sensor for detecting the presence and absence of a child in the infant seat;
    a relay for detecting an on and off state of the vehicle
    a signal controller for automatically generating an alarm signal in response to said sensor detecting the absence of a child in the infant seat and said means for detecting the on and off state of the vehicle detects an off state;
    an alarm responsive to said alarm signal, said alarm in communication with and a speaker, said speaker positioned to alert occupants of the vehicle;
    a timer for delaying activation of said alarm, for a programmable time period, for a time period triggered by a dome light of said vehicle being illuminated in response to a door of said vehicle being opened; and
    a sensor for determining operability of said dome light.

11. The system of claim 10, wherein the relay is operable to enable and disable the system.

12. The system of claim 10, wherein said timer is preprogrammed with a one hundred and ten second delay.

13. The system of claim 10, wherein said speaker is positioned under a dash board proximate a driver's side of the vehicle.

14. The system of claim 10, further comprising a switch for incapacitating said means for delaying activation of said alarm in response to said sensor determining that said dome light is inoperable.

15. A method of alerting persons of the presence of a child in an infant seat in a vehicle comprising:
    sensing the presence a child in an infant seat;
    sensing said vehicle in an off state
    after a pre-established time period of sensing the presence a child in an infant seat and sensing said vehicle in an off state, without delay, automatically generating an alarm signal;
    responsive to said alarm signal, causing an audible alarm to sound such that occupants of said vehicle are alerted; and
    providing a factory preset timer operable to delay activation of said audible alarm for a time period triggered by a dome light of said vehicle being illuminated in response to a door of said vehicle being opened.

* * * * *